United States Patent [19]

Stricot

[11] Patent Number: 5,099,820
[45] Date of Patent: Mar. 31, 1992

[54] ABRASION-TYPE SPLITTING UNIT

[75] Inventor: Francois Stricot, Herblay, France

[73] Assignee: Photec Industrie S.A., Mantes-la-Ville, France

[21] Appl. No.: 499,503

[22] PCT Filed: Oct. 27, 1989

[86] PCT No.: PCT/FR89/00561
§ 371 Date: Sep. 4, 1990
§ 102(e) Date: Sep. 4, 1990

[87] PCT Pub. No.: WO90/05053
PCT Pub. Date: May 17, 1990

[30] Foreign Application Priority Data

Nov. 3, 1988 [FR] France ............... 88 14318

[51] Int. Cl.⁵ ............................................. B28D 1/06
[52] U.S. Cl. ............................ 125/16.01; 125/16.02; 125/23.01; 51/165.77; 51/165.8; 51/165.9
[58] Field of Search ............ 125/23.01, 21, 35, 16.01, 125/16.02, 23.01; 51/165.77, 165.8, 165.9

[56] References Cited

U.S. PATENT DOCUMENTS

| 3,032,026 | 5/1962 | Raabe .................. 125/21 |
| 4,160,439 | 7/1979 | Piat .................... 125/21 |
| 4,640,259 | 2/1987 | Shimizu . |
| 4,826,127 | 5/1989 | Koblischek et al. . |

FOREIGN PATENT DOCUMENTS

| 0046272 | 2/1982 | European Pat. Off. . |
| 0188862 | 7/1986 | European Pat. Off. . |
| 61-100365 | 5/1986 | Japan . |
| 61-121869 | 6/1986 | Japan . |

OTHER PUBLICATIONS

Copy of International Search Report and Annex.

Primary Examiner—M. Rachuba
Attorney, Agent, or Firm—Sandler, Greenblum, & Bernstein

[57] ABSTRACT

Abrasion-type splitting unit for splitting an ingot composed of hard material into a plurality of wafers. The unit includes two identical, horizontal and parallel wire guide cylinders arranged facing one another, and turning synchronously, a wire which unwinds from a supply coil and is then wound under tension around the wire guides to form at least one set of cutting wires before being reengaged by a take-up coil, and an actuator operating according to a vertical axis passing through the center of gravity of an ingot in order to lift a bracket carrying the ingot, and press the ingot against the cutting wires. In particular, the unit includes a supporting structure having a single component, which is symmetrical to the median vertical plane, and perpendicular to the wire guides. Additionally, the supporting structure includes two upper lateral flanges which carry on both sides the wire guides, with the bracket having guide members interacting with rails on the supporting structure.

21 Claims, 6 Drawing Sheets

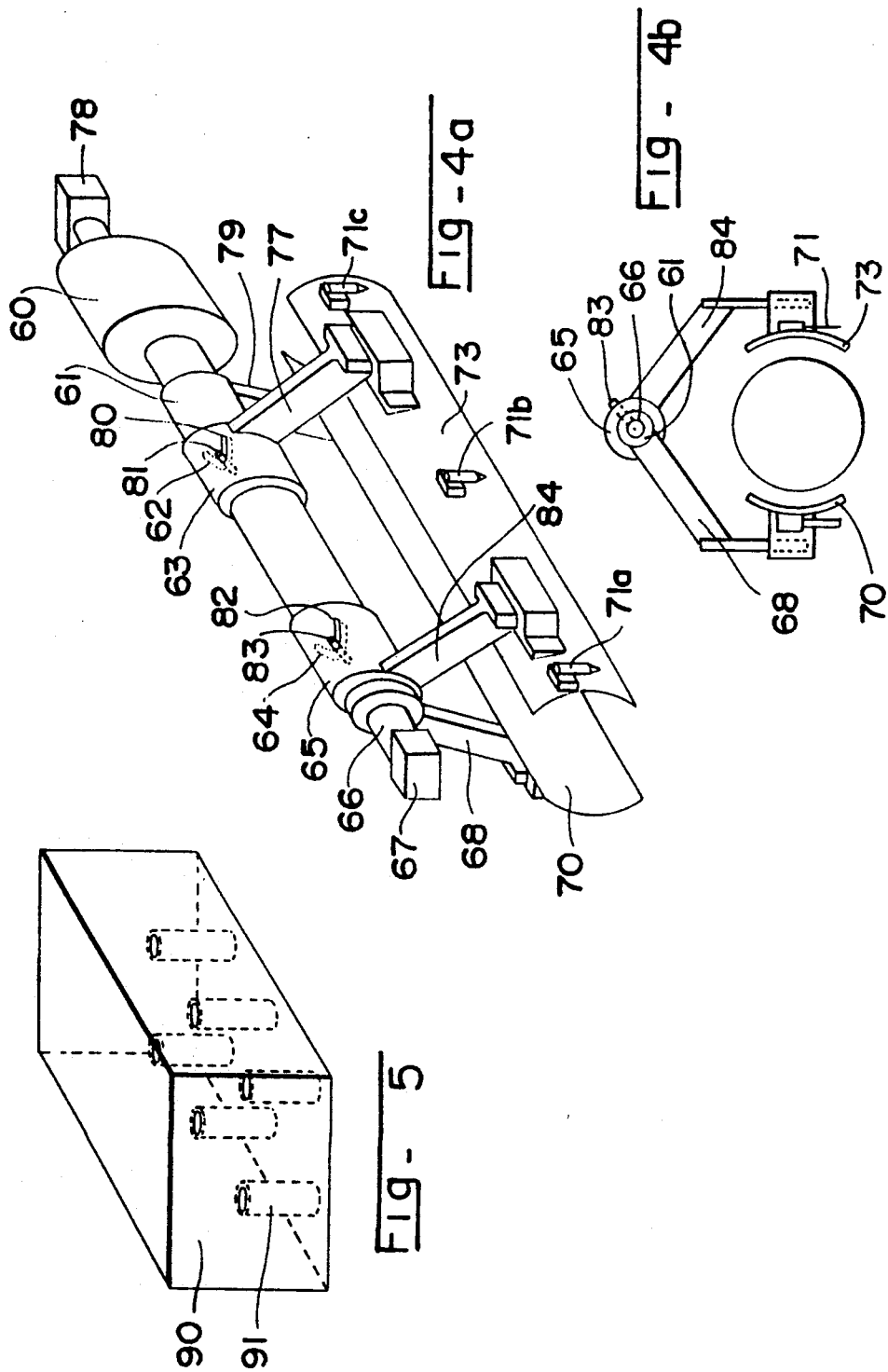

ABRASION-TYPE SPLITTING UNIT

BACKGROUND OF THE INVENTION

The present invention relates to an abrasion-type splitting unit for splitting ingots made of hard material. This invention more particularly concerns cutting machines used in the electronics and the photoelectric cell industries for splitting an ingot of silicon, germanium or glass into a multiplicity of thin wafers.

DISCUSSION OF BACKGROUND MATERIAL

Cutting machines usually comprise at least two drums, also called wire guides, having on their cylindrical surfaces a series of circular grooves with the pitch adapted to the desired splitting. These wire guides are arranged in a horizontal plane, starting from a given vertical plane. A steel wire is wound around these wire guides to provide at least one horizontal set of cutting wires composed of a series of strands of steel wire parallel to one another. This wire may be set in motion by rotation of the wire guides. Also, the set of cutting wires is wet by an abrasive liquid, such as a suspension of particles of silicon carbide in water or oil. The ingot to be split is pushed against the set of wires from below by a plate. Abrasive particles carried by the liquid, which liquid is carried by the wire, thus produce a splitting or cutting effect.

Research ia now directed to optimizing the cutting quality obtained under mass production conditions. By cutting quality is meant exact planarity of the surfaces with a minimum of induced mechanical damage. Mass production considerations are, for example the rate of war of the wire, the possibility of recovering abrasive and/or a high product rate such as 2000 wafers per 80 cm ingot. Achieving an optimum cutting quality depends on a combination of parameters, such as the wire diameter which is of the order of 0.2 mm, the quality of the abrasive, the force with which the ingot is pressed against the set of wires which is currently set at about 50 g/line, the speed of the wire set at about 3 m/s and the wire tension which is preferably set to a value of the order of 2.5 kg (i.e. 26N).

Known splitting units or machines usually comprise a vertical front part from which two or three wire guide cylinder!s project perpendicularly, i.e. horizontally towards the front. In the same vertical plane are also arranged at different locations a supply coil of cutting wire, a take up coil and a wire tensioning device, for example, employing a lever arm, before winding about the wire guides. For example, reference can be made to the machines described in U.S. Pat. No. 3,478,732, U.S. Pat. No. 3,525,324 and FR 2 254 948. In the latter, an ingot to be cut is placed on an arm 60 also projecting from the front vertical plane. These wire guides and support plate are arranged in cantilever fashion and, because of the inherent elasticity of the steel of which they are made, forces acting between the set of wires and the ingot during cutting are transferred to the wire guides and to the supporting arms, necessarily producing a deflection of these components towards the right or left respectively, depending on the direction of motion of the wires.

In the machines described in FR 2,330,510 and U.S. Pat. No. 4,640,259 and the actuator moving the ingot-supporting plate acts along an axis passing through the center of gravity of the ingot. However, in these machines the means for vertically guiding the actuator still remain insufficient to prevent any vibration and/or flexion of this arm, and hence of the plate during sawing.

It can readily be understood that because o:
serious errors in selection of the technology of the chassis,
poor control of the motion and tension of the wire,
an incomplete system for motion of the ingot to be sawn,
and a poorly-adapted distribution of the abrasive liquid, the cutting quality is affected in the following ways :
scratches on the sawn faces,
defects of parallelism between the faces of a wafer,
cylindrical-conical dishing of the sawn faces,
cuts at the leading edge of the wire wider than at the trailing edge,
as well as there being the following consequences on mass production conditions:
very long sawing times,
simultaneous cutting of a low number of pieces,
and high production costs.

Moreover, known splitting units also suffer from the following defects:
the absence of a device enabling precise orientation of the axis of a crystalline ingot necessary so that cutting by abrasion takes place following the planes of crystallization,
the absence of exact analysis of the static and dynamic forces and constraints before and during sawing which enables such data to be integrated in a program loaded in electronic data processing means automatically controlling motion of the different mobile components of the splitting unit.

SUMMARY OF THE INVENTION

The object of this invention is to solve the problem set out above by proposing an abrasion-type splitting unit, in other words a cutting machine which in particular enables:
the wires to be held in their ideal position whatever the load conditions may be, by means of highly stable wire guides,
a device for controlling motion of an ingot to be sawn to be designed with 4 degrees of freedom while ensuring a firm and precise holding of the ingot in its position,
various important parameters to be recorded during operation so that they can be controlled and regulated relative to reference points according to a specific cutting procedure for each ingot.

In this description, the direction "X" means the direction of the axis of the wire guides, the direction "Y" means the horizontal axis perpendicular to, X. and the direction "Z" is the vertical axis. Moreover, relative to an observer placed in front of the machine, by "frontal" is meant a part cf the machine facing the observer, by "rear" is meant a part of the machine away from the observer, i.e. towards the rear, and "right" and "left" are always taken with reference to the same observer.

These objects are achieved by means of an abrasion-type splitting unit for splitting an ingot made of hard material into a plurality of wafers, comprising at least two identical, horizontal and parallel wire guide cylinders arranged facing one another and turning synchronously; a wire which unwinds from a supply coil and is then wound under tension around the wire guides to form at least one set of cutting wires before being re-engaged by a take-up coil, and an actuator operating according to a vertical axis passing through the center of gravity of the ingot to lift a bracket carrying the ingot and press it against the set of cutting wires. More specifically, this splitting unit comprises a supporting structure made of a single piece which is symmetrical to the median vertical plane and perpendicular to the wire guides. This supporting structure has two upper lateral flanges which carry on both sides the wire guides. Moreover, in its lower part this supporting structure has means guiding the bracket carrying the ingot.

Preferably, the bracket carrying the ingot is T-shaped with its vertical part facing the supporting structure. The guide means thus comprise on each lateral edge of the vertical part of the bracket at least one roller race engaging in a corresponding vertical guide rail located on the supporting structure.

According to a first advantageous embodiment, the actuator consists of a ball-bearing mounted screw and nut driven by an incrementally-coded d.c. motor controlled by electronic data processing means that control lifting of the ingot according to a pre-established ingot splitting procedure.

According to another advantageous embodiment, the actuator is a hydraulic jack supplied by a pump via a distributor controlled by electronic data processing means that control lifting of the ingot according to a pre-established ingot splitting procedure.

According to another advantageous embodiment, the actuator is a compressed air jack with pressure adjustment means controlled by electronic data processing means that control lifting of the ingot according to a pre-established ingot splitting procedure.

Usefully, the horizontal part of the T-shaped bracket comprises a plate slidably mounted parallel to the axis X of the wire guides inside a groove in the horizontal part by means of roller-slides. The horizontal part also comprises mechanical, electro-mechanical or hydraulic means for fixing the position of the plate in the plane of the horizontal part of the bracket. These means for fixing the position of the plate may comprise a screw engaged through balls in a threaded opening of the plate, which screw is driven by a reducing motor that is controlled by electronic data processing means according to a pre-established ingot splitting procedure.

The horizontal part of the T-shaped bracket also usefully comprises a turning plate having position-locking means enabling adjustment of the orientation of the axis of the ingot relative to the axis of the wire guides by rotation about the vertical axis Z.

The horizontal part of the T-shaped bracket also usefully comprises a plate oscillating about a horizontal axis located under the ingot in the median plane perpendicular to the set of cutting wires and parallel to the wire guides, which plate is driven by a reducing motor that is controlled by electronic data processing means to drive the plate with oscillations whose amplitude and frequency depend on the pre-established splitting procedure for the ingot.

In advantageous arrangements, the splitting unit further comprises a device for extracting a split ingot, comprising at least one pincer having two arms respectively carrying opposed shells of identical part-cylindrical shape, motion of the pincer being controlled by programmable automatic drive means. The shells are also advantageously provided on their outer faces with pins adapted to be inserted in corresponding sleeves situated at the bottom of a washing tank so as to position and hold the shells in this tank thereby holding the split ingot during washing. This unit may also further comprise a device for initially installing the wire on the wire guides.

It may also be useful for the set of cutting wires to be immersed from below in abrasive liquid by means of a longitudinal distributor with constant level. It may also be useful for the ingot to be cooled during splitting by a longitudinal nozzle blowing cold air.

In other words, the invention is characterized by:
a supporting structure cast in a single piece,
a device for supplying wire upstream of the splitting.
a stress generator (tensioning device),
a device for taking up wire downstream of the splitting,
means for distributing abrasive cutting liquid,
an air cooler for cooling the ingot,
a system for washing the ingot after cutting
a system for placing the wafers on the conveyor unit.
a device for controlling motion of the ingot to be cut which has 4 degrees of freedom :
one system for vertical motion along axes Z of the ingot,
one system for oscillating the ingot along its axis X.
one system for moving the ingot along axis X, and
one system for orienting the axis of the ingot about axis Z.

BRIEF DESCRIPTION OF THE DRAWING

The invention is described in more detail below with reference to embodiments given by way of non-limiting example shown in the accompanying drawings, and in which FIGS. 4a and 4b are respectively a perspective view and a side elevational view from the right of the device, for removing the split ingot, FIG. 5 is a perspective view of the washing tank.

DETAILED DESCRIPTION OF THE PREFERRED EMBODIMENTS

Figure 1:
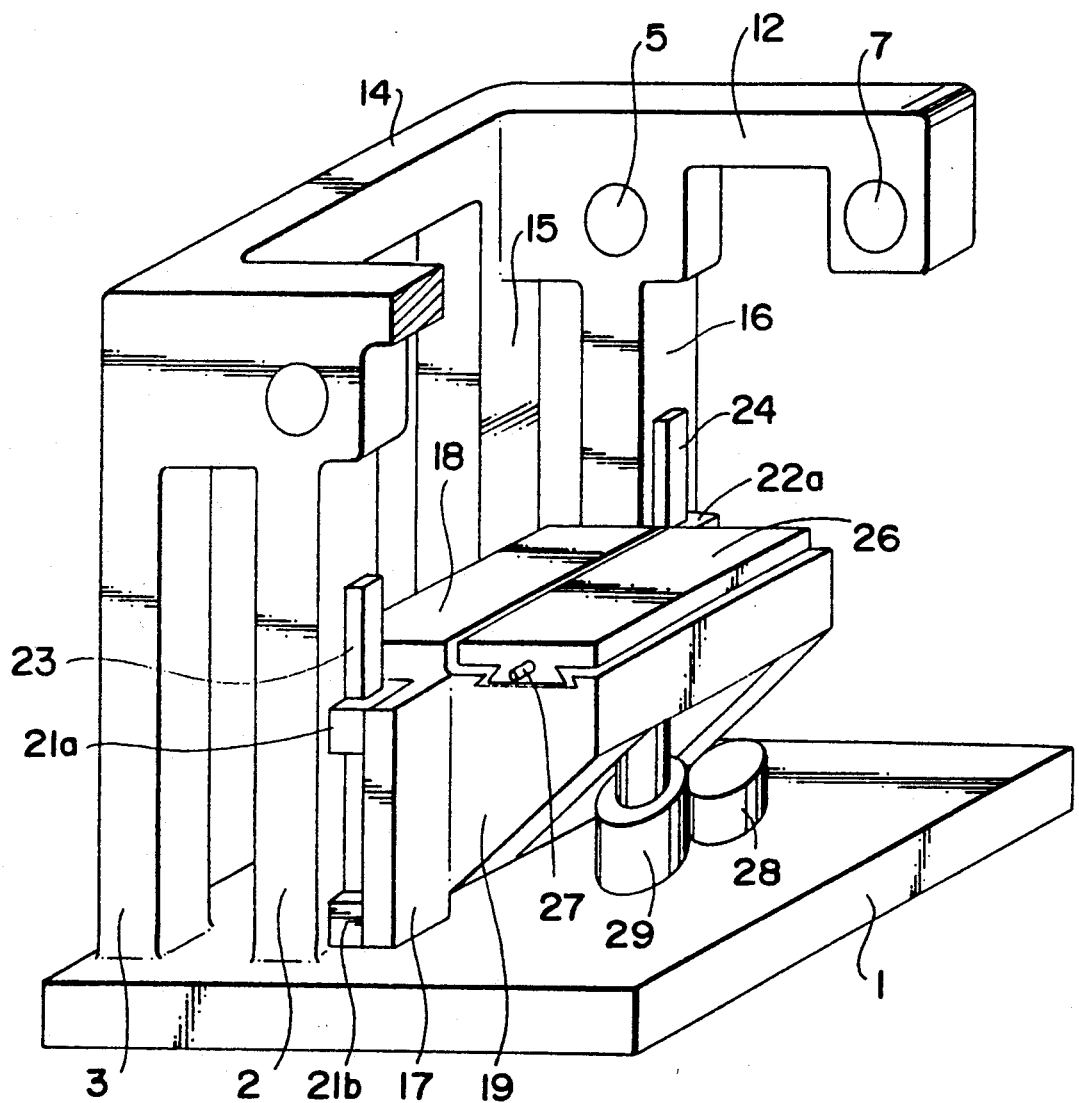
FIG. 1 is a perspective view of a first embodiment of a molded support structure designed for two wire guides with the bracket having vertical motion Z and the plate horizontal motion X.

With reference to FIG. 1, the one-piece supporting structure made of stabilized CS cast iron is designed so that any deformations will be very small and will be entirely localized in the vertical planes containing the Y axis, i.e. normal to the wire guides, in such a manner that the wires, exactly maintain their position along the X axis, substantially parallel to the axis of the ingot during the splitting cycle whatever the conditions of loading may be.

More particularly, the supporting structure shown in FIG. 1 Comprises as a single block a horizontal base 1 from the rear part of which extend four columns 2, 3, 15 and 16. Columns 3 and 15 are interconnected by a bridge 14. Columns 2 and 3, as well as 15 and 16, are respectively connected together by two lateral walls whose extensions 11 and 12 constitute two lateral flanges. By flanges is meant pairs of flat parts in parallel relationship serving to support a shaft. The right lateral flange 12 has two circular openings 5 and 7, whereas, on the portion of the left lateral flange 11 is shown only the rear circular opening 4 Corresponding to opening 5. The openings 4 and 5 are designed to receive the shaft of a first rear wire guide, the right hand end of the shaft of the front wire guide being adapted to be inserted in the circular opening 7.

It can readily be understood that the fact that the supporting structure is molded in a single piece with the base 1 and including the flanges 11 and 12 makes it extremely rigid especially along the Y axis, i.e. parallel to the flanges which constitutes the orientation of the action and reaction between the wire guides and the ingot during splitting. This rigidity results firstly from the weight and hence the inertia of the one-part supporting structure and secondly from its configuration, in particular is due to the dual columns 2 and 3 as well as 16 and 15 along each lateral side.

Figure 2:
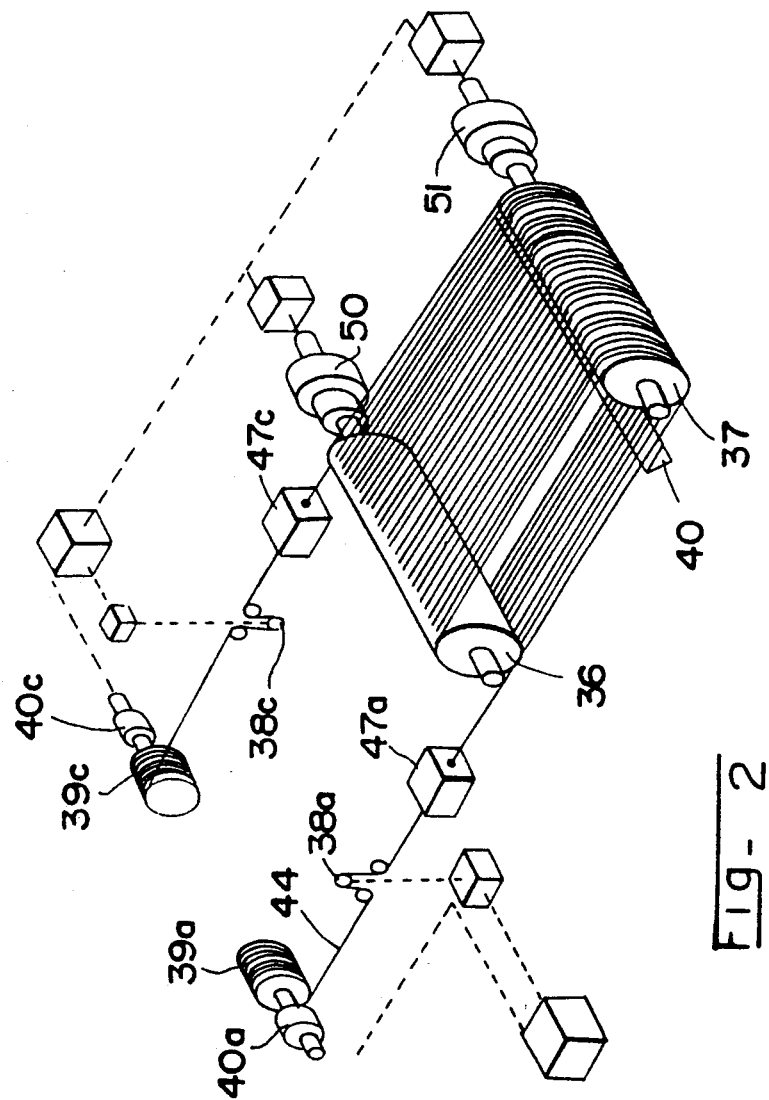
FIG. 2 is a perspective view of the path of the cutting wire.

With reference to FIG. 2, metal wire 44 is unwound from a supply coil 39a under low tension. This wire passes by a force detector 38a then through a wiping device 47a before being wound around two wire guides 36 and 37. The wire 44 exits the wire guides to pass through a wiping device 47c, then in force detector 38c before being reengaged by a take up coil 39c. Electronic data processing means, schematically illustrated in FIG. 2 by blocks joined by dashed lines, enable, from voltage measurements made by the detectors 38a and 38c, control respectively of reducing motors 40a and 40c of the supply and take up coils, as well as reducing motors 50 and 51 driving the wire guides 36 and 37. By reducing motors is meant the association of a motor, preferably an electric motor, and a gear box that reduces the speed of rotation of its output shaft. According to programs loaded into the data processing means, the latter may, for example, generate a predetermined voltage in the wires for control of the output and the take up of coils 39a and 39c as described in detail in French patent specification FR 2,254,948. The voltage generator may also be made of a cylinder (not shown) that is applied with a controlled pressure on the upper set of wires.

A distributor 40 for abrasive cutting liquid is in the form of a longitudinal upwardly-flaring tank filled with liquid supplied from below by means/of an inlet (not shown) with a quantity just sufficient so that the liquid comes to above the front and rear edges without overflowing. The distributor 40 is located adjacent the wire guide 37 when the wire is unwound from coil 39a towards coil 39c.

Wire cleaning devices 47a and 47c may employ a transverse or longitudinal jet of compressed air in the middle of a venturi. These devices may also comprise one or several felt-lined rollers rotating in the direction opposite to the direction of motion of the wire.

A longitudinal air nozzle (not shown) may be arranged between the two wire guides in the middle of the sets of wires to permanently blow Cold air against the ingot thus cooling it. This separate cooling device dispenses with the need to use abrasive liquid as cooling fluid, hence minimizing its consumption with consequent reduction of the running costs of the machine.

The wire guides 36 and 37 are full metal cylinders whose external surfaces are coated with a non-adhesive layer of plastic or hard polymer such as that sold under the tradename VULCOLAN. In this external surface are provided a series of side-by-side circular grooves whose pitch defines the thickness of the wafers to be formed. These grooves, seen in transverse cross-section, have a V-shape directed towards the inside of the cylinder.

With reference to FIGS. 1 and 2, it can be seen that the supporting structure and the path of wire 44 are exactly symmetrical relative to the vertical median plane perpendicular to the wire guides. Because of this symmetry the cutting wire can be driven at choice in either direction. In other words, the coil 39a alternately becomes the supply or take up coil and conversely for coil 39c However, each time the direction of the path is reversed, the device 40 for supplying abrasive fluid should be moved adjacent the wire guide 36 or 37. As a result of this symmetry in the architecture of the splitting unit the forces of action and reaction between the ingot and the set of cutting wires are distributed tangentially and equally between the flanges 11 and 12.

The device for controlling motion of the ingot to be cut controls four movements that can be inter-related by mathematical functions in the data processing means and can be actuated separately or in synchronism by electronic and electro-technical means to generate specific cutting faces. This device for controlling motion of the ingot includes :

1. upward or downward motion along the vertical axis Z,
2. longitudinal motion of the ingot along the axis X parallel to the wire guides,
3. oscillatory rotation of the ingot about a sub-jacent axis parallel to the axis X,
4. rotation about the vertical axis Z to orient the axis of the ingot to be cut relative to the axis of the wire guides.

With reference to FIG. 1, the device for upward and downward vertical motion along axis Z comprises a bracket 19 whose vertical wall 17 is mounted on the supporting structure by two roller slides force-fitted without play. Races or roller cages 21a21b and 22a (22b is not visible) of the slides are fixed to the side edges of the vertical wall 17 and these races slide on guide rails 23 and 24 fixed to the columns 2 and 16 of the supporting structure. Vertical motion of the bracket 19 is generated by means of a ball-bearing screw and nut device 29 actuated by an incrementally-coded motor 28 placed vertically between the base 1 of the supporting structure and the underneath face of the horizontal part 18 of the bracket along a vertical axis Z passing through the center of gravity of the ingot. The force producing upward motion is continuously measured by electronic data processing means and is possibly regulated relative to a reference value that may be fixed or may vary according to a mathematical function processed by the data processing means.

More specifically the T-shaped configuration of the bracket 19 with its horizontal part 18 and vertical part 17 makes it possible to maintain the plate 18 exactly horizontal by an efficient holding of the vertical part 17 against and parallel to the vertical part of the supporting structure formed by the columns 2 and 16. This holding is provided on the left by a guide rail 23 fixed to the column 2 and on the right by a guide rail 24 fixed to the column 16. The vertical part 17 is provided on its left lateral edge with an upper roller cage 21a and a second lower roller cage 21b, and on its right lateral edge in like manner with an upper roller cage 22a and a lower cage, not shown. When these roller cages are engaged with the corresponding rail of the motion but prevents any deviation especially by jamming with rotation about the perpendicular Y axis or by forward tipping of the plate i.e., with rotation about the lower edge of the part 17. Moreover, the thicknesses of the parts 18 and 17 are so calculated that the center of gravity of the bracket 19 is situated in the horizontal plane 18 at a point through which the vertical axis of actuation of the actuator 29 passes and where the ingot to be split will also be placed. In this manner, the actuator 29 fully supports the weight of the bracket and no shearing force is produced through the roller cages.

Of course, the actuator 29 may also be a hydraulic jack supplied by a pump via a distributor or a compressed-air jack with pressure-varying means, these control members in either case being controlled by the electronic data processing means.

Figure 3:
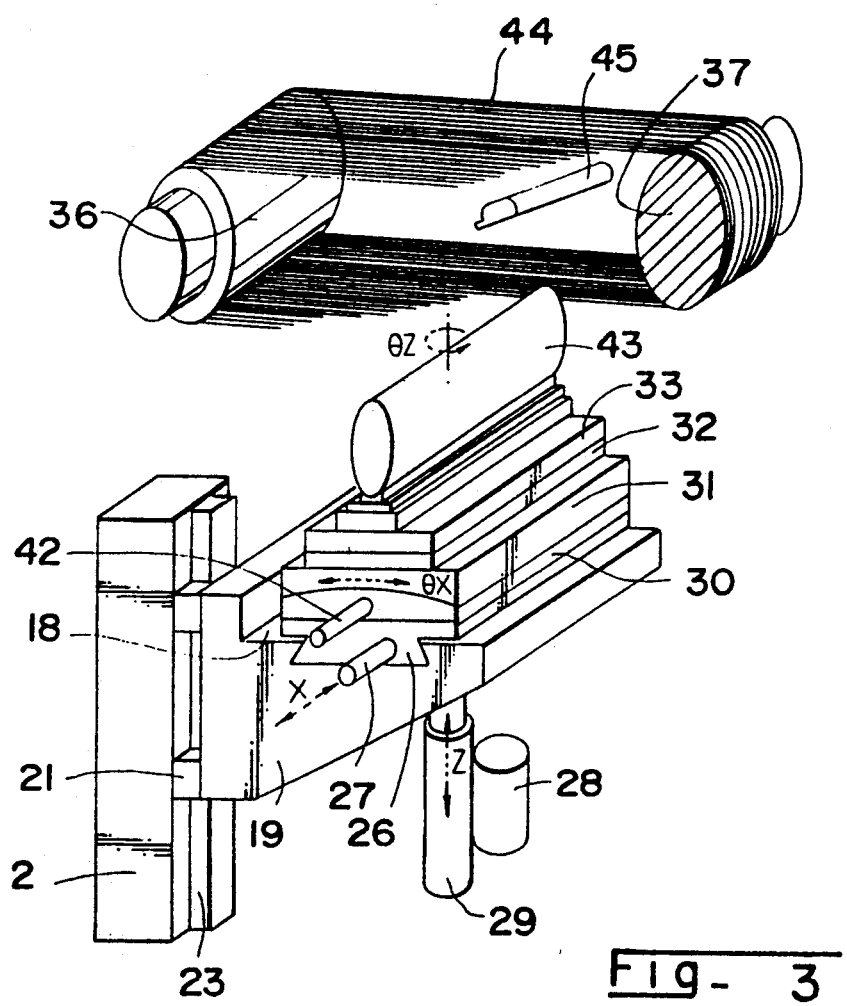
FIG. 3 is a detailed perspective view of the device for controlling the orientation and motion of the ingot on the bracket.

With reference to FIG. 3, the device for producing longitudinal motion parallel to the X axis of the wire guides is provided by means of a plate 26 slidably mounted inside a groove provided in the horizontal part 18. Slidable mounting of the plate 26 is preferably provided by means of rollers slideably inserted between this plate and the bracket. Translational motion is produced by a ball-bearing screw and nut force fitted without play and driven by a reducing motor 27. This motion along the X axis is of small amplitude and serves firstly to adjust the longitudinal position of the ingot if necessary and secondly at the end of splitting to produce a lateral cutting for separating the sliced ingot from its support. Of course, such motion produced by the reducing motor 27 is controlled by the electronic data processing means according to the specific procedure for an ingot.

On the previously described plate 26 is fitted a second oscillatory device by means of which the ingot can be rotated centered on a horizontal axis situated under the ingot in the median plane perpendicular to the act of cutting wires. This device comprises a first plate 30 whose upper surface is dished as portion of a convex cylinder, and on which is arranged a second plate 31 whose lower face is curve complementary to the upper face of plate 30. Plate 31 can be rearwardly moved by a reducing motor 42 along the circular arc of the cylindrical joint. This device can be used to oscillate the ingot 43 forwards and backwards with a predetermined amplitude and frequency enabling the arc of contact between the wire and the ingot to be controlled and at the same time produce a very accurate rectification of the faces of the wafers because the wires produce a crossed sawing action during this oscillation.

Still with reference to FIG. 3, the device for controlling motion of the unit comprises, in addition to the previously described components, a device for orienting the longitudinal axis of the ingot relative to the axis of the wire guides by means of a more or less big rotation about the vertical axis Z. This device comprises a base 32 having a central pivot penetrating in a corresponding circular opening provided in the lower face of the pivoting plate 33. This device is also provided with angle measurement means as well as means for locking it in its new position of the pivoting plate 33 on the base 32. This possibility of orienting the axis of the ingot relative to the axis of the wire guides is necessary to set the plane of crystallization of the ingot co-planar with the vertical plane of cutting of the set of cutting wires.

With reference to FIGS. 4, the splitting unit also further comprises a device for removing the split ingot. This device comprises two opposite shells 70, 73 having a part-cylindrical shape of diameter equal to that of the ingot to be removed. The rear shell 70 is attached by two arms 68 and 79 to a tube 61 that is rotatable about a shaft 66. The front shell 73 is attached on its right by an arm 77 to a cylinder 63 situated outside the tube 61 and on the left by an arm 84 to a cylinder 65 also situated outside the tube 61. Motion of these tubes 63 and 65 is restricted to rotation relative to the tube 61. On the left hand side, a pin 83 perpendicular and fixed to the shaft 66 passes through helicoidal grooves 64 of the tube 61 and 82 of cylinder 65, respectively. Similarly, on the right hand side, a pin 81 perpendicular and fixed to the shaft 66 passes through a helicoidal groove 62 of the tube 61 and a helicoidal groove 80 of the cylinder 63, respectively. Thus, when the shaft 66 is moved in translation by the reducing motor 60, with the tube 61 and cylinders 63, 65 being restrained from translational motion by means not shown, the respective motion of the pins 81 and 83 in the grooves forces the opposing shells 70, 73 to move apart or together. In this way, it is possible to control at will the gripping or the release of an ingot 43 by this removal device. Two and blocks 67 and 78 enable this assembly to move on rails, not shown.

The external face of the shells 70 and 73 is also provided with downwardly-directed pins 71a, b and c. in cooperation with sleeves 91 situated in the bottom of a washing tank 90 as illustrated in FIG. 5, these pins enable the shells 70, 73 containing the split ingot to be held in position in the bottom of the washing tank once the arms 68, 77, 79 and 84 have been removed from the shells. It is then possible to wash the split ingot, i.e., to remove pasty residues produced during sawing from between the wafers. The washing solvent may be circulated in tank 90 by a pump from the top of the now-slit ingot, this solvent flowing down and flushing with it a mixture of sawdust and abrasive product that settles at the bottom of the tank 90 where the solvent is taken in by the circulation pump. This washing unit may additionally be provided with another automatic handling device for picking up the cleaned wafers one by one and placing them on a conveyor belt for further processing.

Figure 6:
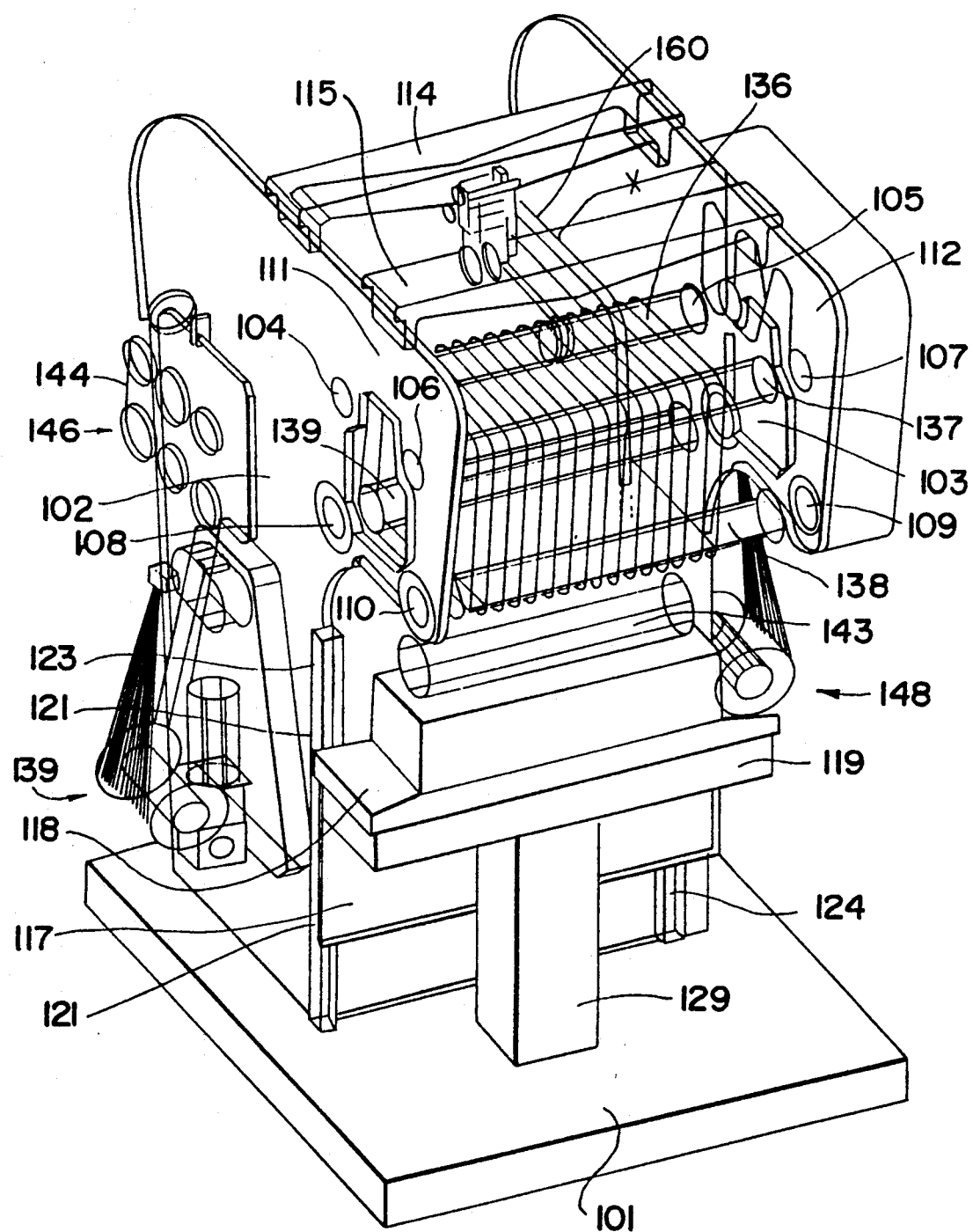
FIG. 6 is a perspective view of a second embodiment of molded supporting structure designed for four wire guides enabling larger ingots to be split.

FIG. 6 illustrates a machine tool according to the invention designed for splitting large ingots 143, i.e., having a length of about 800 mm and a diameter of about 200 mm. It is possible to simultaneously cut about 2000 wafers in such ingots. However, it will readily be understood that the forces of action and reaction between the set of cutting wires and the ingot are substantially greater. Moreover, to provide an adequate space for the ingot during the splitting operation, there are provided four wire guides 136, 137, 138 and 139 about which the cutting wire 144 is wound. The one-piece supporting structure of this machine comprises a base 101, two lateral walls 102 reinforced at the top with two cross-pieces 114 and 115, and respectively having two lateral flanges 111 and 112. In the left-hand lateral flange 111 are provided openings 104, 106, 108 and 110 for the shafts of the wire guides, and in the right-hand flange 112 are provided openings 103, 105, 107 and 109 for the shafts of the wire guides.

The cutting wire i unwound from a supply coil 140 and firstly passes in a tension-damping device 146, then inside the supporting structure where it is placed under tension and is then wound about the wire guides. There is a similar device on the right hand side of the machine up to the take up coil 148. As before, the front face of the supporting structure further comprises on either side two rails 123 and 124. The T-shaped bracket 119 comprises as before a horizontal part 118 and a vertical part 117 held against guide rails 123 and 124 by roller races of which only those, 121, on the left hand side are visible. The bracket 119 is movable vertically by the below-situated actuator 129.

Because of the dimensions of this cutting machine, it may also be useful to provide a device for initially installing the cutting wire on the wire guides or which only the upper part 160 is shown for the purpose of clarity of the drawing. This device may comprise a generally square shaped rail having rounded angles and inside which a carriage circulates. This substantially square rail is arranged perpendicularly about the wire guides and is moveable in translation along these wire guides by means not shown. Either the carriage carries a coil of wire that is unwound, or it holds only one end of the wire and during the installation process the wire guides must be turned to directly unwind the coil 140.

Figure 7:
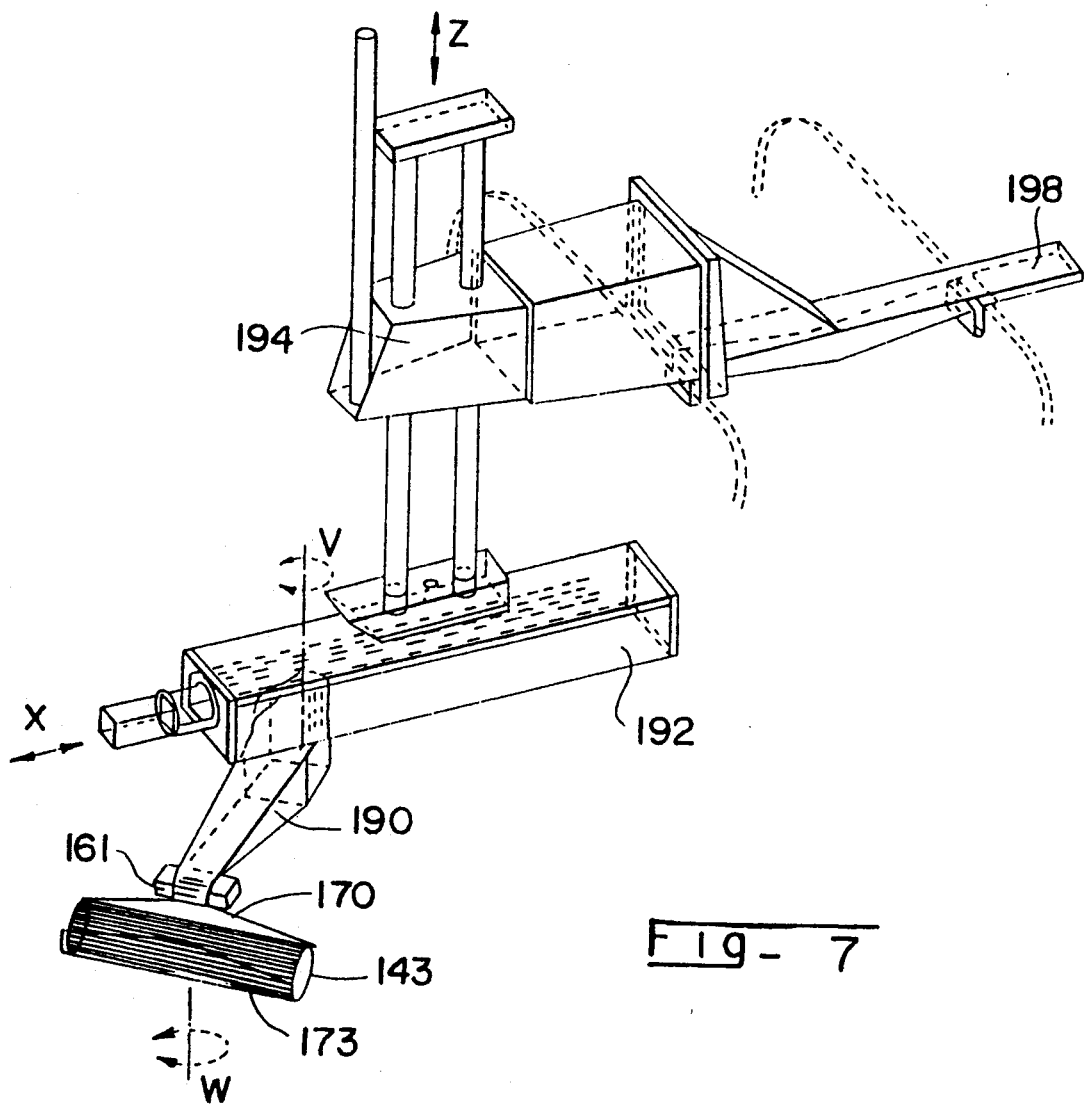
FIG. 7 is a perspective view of the device for removing the split ingot, especially designed for the splitting unit shown in FIG. 6.

FIG. 7 illustrates the device for removing the split ingot 143, specially designed for the machine illustrated in FIG. 6. This device comprises an automatic means mounted on a cross-member 198 extending above the supporting structure. These automatic means comprising means 194 for vertical motion, mans 192 for a translational motion along the X axis and an arm 190 able to turn about an axis V. At the end of this arm 190 is situated a pincer device 161 having two arms respectively carrying a shell 170 and 173 of part cylindrical shape for gripping the ingot. There are means for turning this pincer about the axis W. As before, the shells 170 and 173 are provided with means, such as pins enabling them to be securely fixed to the bottom of the washing tank.

Because of the dimensions and the configuration of the supporting structure, it is possible to simultaneously cut numerous wafers in a single ingot without any vibration or deflection, thereby assuring a sought-after quality for the resulting wafers especially their planarity and the absence of any induced mechanical damage. Control of this machine by electronic data processing means enables the proper performance of the sawing operations to be followed at each instant with reduced personnel requirements. Its high output makes the machine also advantageous from the economic standpoint. Many improvements may be made to this unit within the scope of this invention.

I claim:

1. An abrasion-type splitting unit for splitting an ingot made of hard material into a plurality of wafers, comprising:
   at least two identical, horizontal and parallel wire guide cylinders arranged facing one another and capable of synchronous rotation;
   a supply coil;
   a take-up coil;
   a wire which is capable of being unwound from said supply coil, wound under tension around said at least two wire guide cylinders to form at least one set of cutting wires and wound on said take-up coil;
   a bracket for carrying an ingot, said bracket having a center of gravity and including means for guiding said bracket along a rail member;
   an actuator for vertically lifting said bracket along a vertical axis which passes substantially through the center of gravity of said bracket in order to press the ingot against the at least one set of cutting wires; and
   a support member comprising a one-piece structure including a base, two upper lateral flanges and rail members, said at least two wire guide cylinders being located between said two upper lateral flanges, with opposite end portions of each of said at least two wire guide cylinders being supported by one of said two upper lateral flanges, said two lateral flanges extending substantially perpendicular to said at least two wire guide cylinders and symmetrical to a median vertical plane, and said rail members cooperating with said means for guiding for permitting vertical movement of said bracket.

2. The splitting unit according to claim 1, wherein said bracket for carrying an ingot is T-shaped having a vertical portion facing said supporting member; said rail members are vertically disposed; and said means for guiding comprise, on lateral edges of said vertical portion of said bracket, at least one roller race engaging in a corresponding rail member on said support member.

3. The splitting unit according to claim 1, wherein said actuator comprises a ball-bearing mounted screw and nut driven by an incrementally-coded d.c. motor controlled by electronic data processing means that control lifting of an ingot according to a pre-established ingot splitting procedure.

4. The splitting unit according to claim 1, wherein said actuator comprises a hydraulic jack supplied by a pump via a distributor controlled by electronic data processing means that control lifting of the ingot according to a pre-established ingot splitting procedure.

5. The splitting unit according to claim 1, wherein said actuator comprises a compressed air jack with pressure adjustment means controlled by electronic data processing means that control lifting of the ingot according to a pre-established ingot splitting procedure.

6. The splitting unit according to claim 2, wherein T-shaped bracket includes a horizontal portion having a groove and a plate slidably mounted in said groove parallel to an longitudinal axis passing through said wire guide cylinders, and further including means for positioning said plate.

7. The splitting unit according to claim 6, wherein said means for positioning said plate comprises roller-slides.

8. The splitting unit according to claim 6, wherein said means for positioning comprise mechanical, electro-mechanical or hydraulic means for fixing the position of the plate.

9. The splitting unit according to claim 6, wherein said means for positioning said plate comprise a screw engaged through balls in a threaded opening of the plate and driven by a reducing motor controlled by electronic data processing means according to a pre-established ingot splitting procedure.

10. The splitting unit according to claim 6, wherein said horizontal portion of said T-shaped bracket comprises a turning plate having position-locking means enabling adjustment of orientation by rotation about a vertical axis.

11. The splitting unit according to claim 6, wherein said horizontal portion of said T-shaped bracket comprises a plate oscillating about a horizontal axis located under the ingot in a median plane perpendicular to said at least one set of cutting wires and parallel to said wire guide cylinders, which plate is driven by a reducing motor that is controlled by electronic data processing means for driving said plate with oscillations hose amplitude and frequency depend on a pre-established splitting procedure for the ingot.

12. The splitting unit according to claim 1, further comprising a means for extracting a split ingot.

13. The splitting unit according to claim 12, wherein said means for extracting a split ingot comprise at least one pincer having two arms, with each of said two arms carrying an opposed shell of identical part-cylindrical shape.

14. The splitting unit according to claim 13, wherein motion of said at least one pincer is controlled by programmable automatic drive means.

15. The splitting unit according to claim 13, wherein each shell includes an outer face having pins capable of being inserted in corresponding sleeves situated at a bottom portion of a washing tank.

16. The splitting unit according to claim 15, further including a washing tank for holding a split ingot during washing.

17. The splitting unit according to claim 1, further including means for containing an abrasive liquid.

18. The splitting unit according to claim 17, wherein said means for containing an abrasive liquid comprises a longitudinal distributor positioned so as to immerse a lower portion of said at least one set of cutting wires in said abrasive liquid.

19. The splitting unit according to claim 18, wherein said longitudinal distributor includes means for maintaining abrasive liquid at a constant level.

20. The splitting unit according to claim 1, further including a longitudinal nozzle for blowing cold air on an ingot.

21. The splitting unit according to claim 1, further including means for initially installing the wire on said at least two wire guide cylinders.

* * * * *